United States Patent
Gray et al.

(10) Patent No.: US 10,617,999 B2
(45) Date of Patent: Apr. 14, 2020

(54) PROCESS FOR REMOVING SO2 FROM FLUE GASES USING LIQUID SORBENT INJECTION

(71) Applicant: AECOM Technical Services, Inc., Austin, TX (US)

(72) Inventors: Sterling M Gray, Austin, TX (US); James B Jarvis, Austin, TX (US)

(73) Assignee: AECOM Technical Services, Inc., Austin, TX (US)

( * ) Notice: Subject to any disclaimer, the term of this patent is extended or adjusted under 35 U.S.C. 154(b) by 0 days.

(21) Appl. No.: 16/510,695

(22) Filed: Jul. 12, 2019

(65) Prior Publication Data
US 2020/0016533 A1 Jan. 16, 2020

Related U.S. Application Data

(60) Provisional application No. 62/697,109, filed on Jul. 12, 2018.

(51) Int. Cl.
*B01D 53/83* (2006.01)
*B01D 53/79* (2006.01)
*B01D 53/50* (2006.01)

(52) U.S. Cl.
CPC .......... *B01D 53/83* (2013.01); *B01D 53/501* (2013.01); *B01D 53/508* (2013.01); *B01D 53/79* (2013.01); *B01D 2251/304* (2013.01); *B01D 2251/606* (2013.01)

(58) Field of Classification Search
CPC ............ B01D 53/1456; B01D 53/1481; B01D 53/50; B01D 53/501; B01D 53/502; B01D 53/505; B01D 2202/00; B01D 2251/30; B01D 2251/40; B01D 2257/302; B01D 2258/0283; B01J 2208/00
See application file for complete search history.

(56) References Cited

U.S. PATENT DOCUMENTS

| 4,141,961 A | 2/1979 | Miller | |
| 4,837,001 A | 6/1989 | Miller | |
| 4,885,139 A * | 12/1989 | Sparks | B01D 53/501 422/169 |
| 5,100,643 A * | 3/1992 | Brna | B01D 53/508 423/240 R |
| 5,209,915 A * | 5/1993 | Kidwell | B01D 53/504 423/243.01 |
| 6,253,463 B1 * | 7/2001 | Hansen | F26B 3/12 34/362 |
| 9,429,274 B2 * | 8/2016 | Reynolds | F17D 1/00 |
| 2007/0156288 A1 * | 7/2007 | Wroblewski | G05B 13/042 700/266 |
| 2016/0214027 A1 * | 7/2016 | Fukuda | C02F 1/048 |
| 2017/0225121 A1 * | 8/2017 | Fukuda | B01D 53/80 |
| 2018/0306509 A1 * | 10/2018 | Fukuda | B01D 53/504 |

FOREIGN PATENT DOCUMENTS

| CN | 101332409 A | 12/2008 |
| CN | 105080329 B | 5/2017 |
| KR | 10-2017-0124093 A | 11/2017 |

OTHER PUBLICATIONS

International Search Report and Written Opinion dated Oct. 30, 2019, in corresponding international application No. PCT/US2019/041711.

* cited by examiner

*Primary Examiner* — Timothy C Vanoy
(74) *Attorney, Agent, or Firm* — DuBois, Bryant & Campbell, LLP; William D. Wiese

(57) ABSTRACT

Finely atomized alkaline sorbent salt solutions are injected into a hot flue gas stream to remove $SO_2$. Flash evaporation of the droplets produces very fine dried sorbent particles, which react efficiently with $SO_2$ in the flue gas. The liquid sorbent may be sodium carbonate, sodium hydroxide, sodium sulfite, potassium carbonate, potassium hydroxide or the like. In a coal-fired boiler, the liquid sorbent may be injected after the economizer section, where the flue gas temperature is below 850° F., and upstream of a particulate collection device. The dried sorbent particles react with $SO_2$ and then are removed from the flue gas stream in the particulate collection device, producing a cleaned flue gas stream.

12 Claims, 1 Drawing Sheet

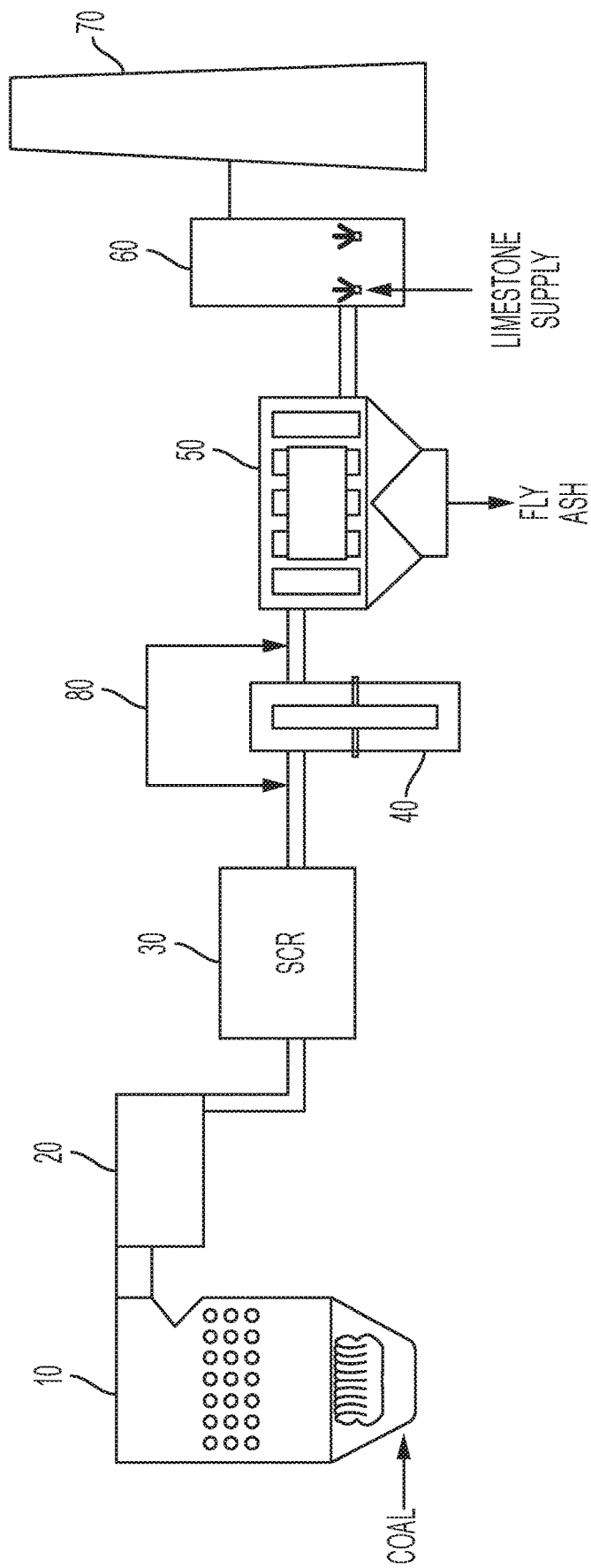

PROCESS FOR REMOVING SO2 FROM FLUE GASES USING LIQUID SORBENT INJECTION

PRIORITY STATEMENT UNDER 35 U.S.C. § 119 & 37 C.F.R. § 1.78

This non-provisional application claims priority based upon prior U.S. Provisional Patent Application Ser. No. 62/697,109 filed Jul. 12, 2018 in the names of Sterling M. Gray and James B. Jarvis entitled "PROCESS FOR REMOVING $SO_2$ FROM FLUE GASES USING LIQUID SORBENT INJECTION," the disclosures of which are incorporated herein in their entirety by reference as if fully set forth herein.

BACKGROUND

The combustion of sulfur-containing fuels in power plants or industrial boilers produces flue gases that contain sulfur dioxide ($SO_2$). Environmental regulations require that these combustion sources control their emissions of $SO_2$. Conventional control technologies include wet scrubbers, spray dryers and dry sorbent injection.

Wet scrubbers are large absorber vessels that contact the flue gas with a recirculated slurry or liquor. The flue gases are quenched in the vessel and fully saturated with moisture, allowing $SO_2$ to be absorbed into the scrubbing liquid. Subsequently the absorbed $SO_2$ is precipitated to produce a solid sludge, or conversely discharged as a wastewater solution. The process can achieve very high $SO_2$ removals (>95%) and is generally applied to flue gas steams with high $SO_2$ concentrations. Wet scrubbers have several disadvantages including very high capital cost, large footprint, high flue gas pressure drop, and costly waste treatment and disposal. Wet scrubbers for $SO_2$ control were originally developed in the 1970's and 1980's, and are now a conventional and mature technology.

Spray dryers are also large absorber vessels that contact the flue gas with a slurry or liquor. However, in a spray dryer the flue gas is only partially quenched or saturated. A slurry mixture of alkaline solids and liquid is injected into the vessel, where it is atomized to produce fine droplets. $SO_2$ is absorbed into the droplets where it reacts with solids in the slurry before the droplet fully evaporates. The resulting dried solids containing the $SO_2$ are then captured in a particulate control device downstream of the spray dryer vessel, typically a new fabric filter or baghouse. The dried solids are captured with other particulate in the flue gas, including fly ash, and typically disposed of in a landfill. The process can achieve moderately high levels of $SO_2$ removal (70-90%), but typically less than a wet scrubber. As a result, the process is typically applied to flue gas streams with moderate $SO_2$ concentrations. Spray dryers have several disadvantages including very high capital cost, large footprint, high flue gas pressure drop, and high reagent and operating costs. Spray dryers used for $SO_2$ control were originally developed in the 1980's, and are now a conventional and mature technology.

Dry sorbent injection (DSI) relies on the injection of very fine, dry alkaline solid powders into existing flue gas ductwork to contact the flue gases. The injected powders typically include hydrated lime, sodium bicarbonate, and sodium sesquicarbonate (sometimes referred to as trona). These sorbents, or reagents, are more expensive than those used in wet scrubbers or spray dryers. The sorbents react with $SO_2$ in the flue gas, with the resulting reaction products collected in a downstream particulate collection device, along with fly ash in the flue gas. $SO_2$ removal for DSI is typically the lowest (30-80%) of the three processes described, with the higher levels requiring very high reagent injection rates. Dry sorbent injection has several disadvantages including only modest $SO_2$ removal, high sorbent and operating costs, and adverse impacts on downstream particulate collection equipment performance, in some cases.

There are a number of patents related to control of $SO_2$ emissions from combustion gases. However, the technology claimed in most patents is well known in the art and the patents have long-ago expired. In addition, most of the patents relate to wet scrubber and spray dryer processes and are very narrowly directed to specific aspects of those technologies.

More recently, several patents have been issued for $SO_2$ control using dry sorbent injection. Some of the patents recently issued in the United States include: U.S. Pat. No. 7,531,154 B2 entitled "Method of removing sulfur dioxide from a flue gas stream," U.S. Pat. No. 6,303,083 B1 entitled Method and system for SO2 and SO3 control by dry sorbent/reagent injection and wet scrubbing," and U.S. Pat. No. 8,828,340 B2 entitled "Dry sorbent injection during steady-state conditions in dry scrubber." However, these patents are all directed to the injection of dry sorbents, and thus are different from the novel features described herein.

Another patent related to the injection of aqueous solutions for acid gas control from flue gases is U.S. Pat. No. 6,803,025 B2. However, this patent describes a process for the removal of $SO_3$ and $H_2SO_4$ from flue gases, but not the removal of $SO_2$. In typical combustion gases, the concentration of $SO_3/H_2SO_4$ is only one to two percent of the $SO_2$ concentration. However, in boilers that burn high-sulfur fuels (>1%), the resulting $SO_3H_2SO_4$ concentration (10-50 ppm) is sufficient to contribute to acid corrosion of equipment in the flue gas path, and other adverse impacts. As a result, the patented process is specifically applied to boilers that burn these higher-sulfur fuels, and for the specific removal of $SO_3/H_2SO_4$.

There is a need, therefore, for a method and system that does not have the high capital cost, large footprint, high water consumption, high pressure drop, and sludge and wastewater production that is costly to treat and dispose of as with wet scrubbers, high capital cost, large footprint, high water consumption, and high reagent operating costs as with spray dryer, or the limited $SO_2$ removal and high reagent operating costs as with dry sorbent injection.

SUMMARY OF THE INVENTION

Various embodiments of the present invention utilize the injection of finely atomized alkaline sorbent salt solutions into a hot flue gas stream, resulting in flash evaporation of the droplets and production of very fine dried sorbent particles, which react efficiently with $SO_2$ in the flue gas. In some embodiments, the sorbent in the liquid sorbent solution is sodium carbonate ($Na_2CO_3$), but other chemicals or solutions are effective and may also be used, including, without limitation, sodium hydroxide (NaOH), sodium sulfite ($Na_2SO_3$), potassium carbonate ($K_2CO_3$), and potassium hydroxide (KOH).

In coal-fired boilers, the aqueous solution is typically injected after the economizer section following the boiler, where the flue gas temperature is below 850° F. The liquid sorbent solution may also be injected upstream of a device designed to collect particulate from the flue gas, such as an electrostatic precipitator, a baghouse, or a fabric filter. The dried sorbent particles react with $SO_2$ and then are removed from the flue gas stream in the particulate collection device, producing a cleaned flue gas stream. The invention is both practical and efficient where the $SO_2$ concentration in the flue gas is less than 1000 ppm.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which:

FIG. 1 shows a schematic diagram of one embodiment of the flue gas desulfurization system of the present invention, including the locations where the liquid sorbent solution is injected into the flue gas stream.

DESCRIPTION OF THE PREFERRED EMBODIMENTS

The present invention is directed to improved methods and systems for, among other things, removing sulfur dioxide from flue gas. The configuration and use of the presently preferred embodiments are discussed in detail below. It should be appreciated, however, that the present invention provides many applicable inventive concepts that can be embodied in a wide variety of contexts other than the specific types of liquid sorbent solution injection described herein. Accordingly, the specific embodiments discussed are merely illustrative of specific ways to make and use the invention, and do not limit the scope of the invention. In addition, the following terms shall have the associated meaning when used herein:

"flue gas" means an exhaust gas that is produced from an industrial process and includes both gas that will be used in connection with the process from which it is produced or even another related process (e.g., to produce heat), which will exit into the atmosphere via a stack for conveying waste exhaust gases from an industrial process. The flue gas can be produced from any industrial process such as a power generating process, metal smelting process and the like; and "injecting" means the introduction of a material into a flue gas from a point external to the duct work containing the flue gas and includes the introduction of a liquid phase solution or a powder into the flue gas, and the placement of a solid in the flue gas stream.

Various embodiments of the present invention include methods and systems for the injection of a liquid sorbent solution into a flue gas stream for the removal of $SO_2$. Typically, the temperature gas in a flue gas stream will be between 1000° F. and 2000° F. In coal-fired boilers, the liquid sorbent solution may be injected after the economizer section following the boiler, where the flue gas temperature is below 850° F., and generally in the range between 600 and 800° F. In most embodiments, the liquid sorbent solution is also injected upstream of a device designed to collect particulate from the flue gas, such as an electrostatic precipitator, a baghouse, or a fabric filter. The dried sorbent particles react with $SO_2$ and are subsequently removed from the flue gas stream in the particulate collection device, producing a cleaned flue gas stream.

Because of the relative cost of the injected sorbents and limitations in the amount of liquid that can be practically injected into the flue gas, the invention is typically applied where the $SO_2$ concentration in the flue gas is less than 1000 ppm. This would be the case, for example, where coal-fired boilers burn low-sulfur fuels resulting in flue gas $SO_2$ concentration ranging from approximately 200 to 500 ppm.

In some embodiments of the invention, the liquid sorbent solution is injected into the flue gas as a finely atomized spray. The mean particle size of the injected droplets may be between approximately 5 and 100 microns. When the liquid sorbent solution is injected into the hot flue gas stream, the liquid in the sorbent solution is fully evaporated to produce very fine solid particles of the injected sorbent that are smaller than the injected liquid droplets from the nozzle. The mean particle size of the dried sorbent may range from approximately 1 micron to 40 microns. As a result, the injected sorbent is effectively divided into a large quantity of particles, possessing very high specific surface area. The quantity of particles and resulting surface area of the particles act to promote rapid and complete reaction with $SO_2$ in the flue gas.

As will be appreciated by those skilled in the art, the invention requires that the liquid fraction of the injected liquid sorbent solution be fully evaporated to produce the fine dried sorbent particles. If the liquid fraction of the injected liquid sorbent solution is not fully evaporated, the droplets will not fully react with the $SO_2$ which may cause undesirable buildup of the sorbent in the downstream ductwork or downstream equipment. Suitable liquids include water and other liquids in which the sorbent is soluble and which evaporate sufficiently quickly and efficiently.

To atomize the injected liquid sorbent solution, the solution may be injected using a dual-fluid nozzle that introduces and mixes the liquid stream with an air stream at high pressures to achieve atomization of the liquid. In some cases, the pressure at which the fluid is injected is between approximately 50 and 150 psi. Alternatively, a single-fluid nozzle may be used that injects only the liquid stream, but at a much higher pressure, typically 500 to 3000 psi.

To promote effective reaction with $SO_2$, the liquid sorbent solution should be well dispersed in the flue gas stream. In some embodiments, this may be achieved by injecting the liquid sorbent solution through a multitude of injection lances, each equipped with a multitude of injection nozzles.

Various sorbents may be used in various embodiments of the present invention. For example, the sorbent fraction of the liquid sorbent solution may be a chemical or salt solution that is alkaline relative to the acidity of $SO_2$, or sulfurous acid ($H_2SO_3$) in an aqueous solution. In some embodiments, the sorbent will have a pH greater than 6. A preferred sorbent is sodium carbonate ($Na_2CO_3$) which reacts with sulfur dioxide to produce sodium sulfite and carbon dioxide. Other chemicals or solutions are also effective and may also be used, including, without limitation, sodium hydroxide (NaOH), sodium sulfite ($Na_2SO_3$), potassium carbonate ($K_2CO_3$), and potassium hydroxide (KOH). These chemicals and salts are highly soluble in water, and thus can be injected in a concentrated form. In some embodiments, for example, the concentrations are greater than 10 weight percent.

Referring now to FIG. 1 which depicts a typical emission control system in a plant configured to burn fossil fuels to produce energy. Coal is conveyed to a coal-fired boiler 10 from an external location (a coal pile or barge, etc.). The steam produced in the boiler is used to produce electrical energy using a system of turbines and ancillary equipment, and condensate produced from the steam is recycled to the boiler 10 beginning at the economizer 20. The energy extracted into the boiler water causes the temperature of the flue gas to decrease, and at the point where the flue gas leaves the economizer 20, the temperature is typically within the range of 600 to 800° F.

The flue gas path between the economizer 20 and the stack 70 typically contains emission control equipment to remove various flue gas contaminants. Equipment typically found upstream of the air preheater 40 can include a selective catalytic reduction (SCR) system 30 to reduce NOx emissions. Equipment typically found downstream of the air preheater 40 can include particulate removal equipment 50, such as a dry or wet electrostatic precipitator (ESP or WESP), a fabric filter (bag house) and a scrubber 60 or other flue gas desulfurization (FGD) system.

The composition of the flue gas leaving the boiler 10 will usually consist of mostly nitrogen (typically more than two-thirds) derived from the combustion air, carbon dioxide (CO2), and water vapor as well as excess oxygen (also derived from the combustion air). The flue gas also typically contains a small percentage of a number of pollutants, such as particulate matter, carbon monoxide, nitrogen oxides, sulfur oxides and mercury. In coal-fired boilers, most of the sulfur in the fuel is converted to sulfur dioxide.

Referring back to FIG. 1, which shows points of injection 80 of a liquid sorbent solution into the flue gas path. The liquid sorbent solution may be injected 80 after the flue gas leaves the economizer 20 and, either in addition or as an alternative, the liquid sorbent solution may be injected 80 before the particulate collection device 50. In each case, the temperature of the flue gas is typically below around 850° F.

Those skilled in the art will appreciate that embodiments of the present invention have an advantage over dry sorbent injection because the reagents may be injected directly in the existing flue gas ductwork, thereby avoiding the expense and downtime associated with the installation of a large vessel for contacting dry sorbent with the flue gas. In addition, the liquid sorbent solution is finely atomized to produce very small liquid droplets that quickly flash evaporate in the hot flue gas, producing even smaller dried particles that are much smaller than the dry sorbent powders that are injected with dry sorbent injection. As a result, the number of dried particles produced, and the surface area of said particles, is far greater than that achieved with dry sorbent injection. Therefore, the reaction rates with $SO_2$ are significantly improved, allowing the invention to achieve measurably higher $SO_2$ removal at measurably lower sorbent injection rates, compared to dry sorbent injection. The invention is particularly attractive for boilers that that burn low-sulfur fuels (<1 weight % sulfur) where moderate to high $SO_2$ removal is required (50-80%).

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be clear that a single embodiment may be substituted for that one device.

In light of the wide variety of methods for removing sulfur dioxide from flue gas known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

We claim:

1. A method for removing sulfur dioxide from a flue gas stream, comprising:
    passing a flue gas stream through an emission control system having a boiler, an economizer, an air heater, a particulate control device and a stack;
    injecting into the flue gas stream a liquid sorbent solution having a liquid fraction and a sorbent fraction, wherein the liquid fraction evaporates upon contact with the flue gas stream leaving the sorbent fraction as dry sorbent particles;
    chemically reacting the dry sorbent particles with sulfur dioxide in the flue gas stream to form a particulate; and
    collecting the particulate in a particulate collection device.

2. The method of claim 1, wherein the temperature of the flue gas stream at the point the liquid sorbent solution is injected is less than 850° F.

3. The method of claim 1, wherein the temperature of the flue gas stream at the point the liquid sorbent solution is injected is between 600° F. and 800° F.

4. The method of claim 1, wherein the liquid sorbent solution is injected into the flue gas stream after the flue gas stream exits the economizer.

5. The method of claim 1, wherein the liquid sorbent solution is injected into the flue gas stream after the flue gas stream passes through the economizer and is also injected into the flue gas stream before the flue gas stream enters.

6. The method of claim 1, wherein the liquid sorbent solution is injected into the flue gas stream as a finely atomized mist.

7. The method of claim 1, wherein the particle size of droplets of the liquid sorbent solution when injected into the flue gas stream is between 5 and 100 microns.

8. The method of claim 1, wherein the liquid sorbent solution is injected into the flue gas stream using a dual fluid nozzle that mixes a liquid stream with an air stream at high pressure to atomize the liquid sorbent solution.

9. The method of claim 1, wherein the size of the dry sorbent particles ranges from 1 micron to 40 microns.

10. The method of claim 1, wherein the concentration of the sulfur dioxide in the flue gas stream is less than 1000 ppm.

11. The method of claim 1, wherein the sorbent fraction of the liquid sorbent solution is sodium carbonate.

12. The method of claim 1, wherein the liquid sorbent solution is sodium carbonate.

* * * * *